United States Patent [19]

Swartz

[11] Patent Number: 5,102,183
[45] Date of Patent: Apr. 7, 1992

[54] TEMPORARY COVER FOR THE PASSENGER COMPARTMENT OF A CAR

[76] Inventor: George J. Swartz, 16577 Timerlakes Dr. - #203, Ft. Myers, Fla. 45377

[21] Appl. No.: 706,367
[22] Filed: May 28, 1991
[51] Int. Cl.⁵ .............................................. B60J 11/00
[52] U.S. Cl. .................................... 296/136; 296/95.1; 160/370.2
[58] Field of Search ............ 296/136, 218, 219, 95.1; 160/370.2; 150/166, 168

[56] References Cited

U.S. PATENT DOCUMENTS

| | | | |
|---|---|---|---|
| 2,950,749 | 8/1960 | MacDonald | 150/52 |
| 3,175,859 | 3/1965 | Abodeely | 296/136 |
| 3,241,877 | 3/1966 | Tate | 296/136 |
| 3,910,330 | 10/1975 | Johnson et al. | 150/52 |
| 4,475,764 | 10/1984 | Hutchinson et al. | 296/136 |
| 4,596,418 | 6/1986 | Koh | 296/136 |
| 4,657,298 | 4/1987 | Yong O | 296/136 |
| 4,718,711 | 1/1988 | Rabbit | 296/136 |
| 4,799,728 | 1/1989 | Akers et al. | 296/136 |
| 4,834,446 | 5/1989 | Tung-Chow | 296/136 |
| 4,842,324 | 6/1989 | Carden | 296/136 |
| 4,850,635 | 7/1989 | Lindell | 296/136 |
| 4,863,210 | 9/1989 | Kenon | 296/136 |
| 4,903,749 | 2/1990 | Hanania | 160/370 |
| 4,948,191 | 8/1990 | Cao | 296/136 X |
| 4,958,881 | 9/1990 | Piros | 296/136 X |
| 5,029,933 | 7/1991 | Gillem | 296/136 |

FOREIGN PATENT DOCUMENTS 1316397 3/1962 France .................................. 296/136

Primary Examiner—Margaret A. Focarino
Assistant Examiner—Joseph D. Pape
Attorney, Agent, or Firm—Biebel & French

[57] ABSTRACT

A car cover is provided for use with cars having a removable top and a hatchback rear window wherein the hatchback rear window is pivoted from a structural member immediately behind the removable top area. The cover includes a flexible body portion and a pair of flaps attached to a rear area of the body portion for engagement in the seam between the rear hatchback and the structural member to hold the rear portion of the cover in place. In addition, elastic cords are provided at two front corners of the body portion for engagement with the side view mirrors of a car to hold the front portion of the cover in place.

12 Claims, 5 Drawing Sheets

TEMPORARY COVER FOR THE PASSENGER COMPARTMENT OF A CAR

BACKGROUND OF THE INVENTION

The present invention relates to a temporary cover for protecting the passenger compartment of a car and more particularly to a cover for use with cars having a removable roof portion.

Cars having a removable roof portion wherein the part of the roof above the passenger's head may be removed and the rear window of the car remains in place, have become popular as an alternative to a full convertible configuration. The removable roof panel may come in the form of a panel which extends across the entire width of the passenger compartment and is supported at the forward edge by the upper portion of the windshield and at the rear edge by a structural member forming a roll-over protection for the passengers. The structural member typically also serves as a support member for a hatchback rear window of the car.

Another form of removable roof panels may be found on cars having a T-top configuration in which a structural member of the car extends along the longitudinal axis of the car between the windshield and a rearwardly located structural member located behind the passenger and driver. In a car having a T-top configuration, two separate panels are provided, one for over the driver area and one for over the passenger area.

While cars having removable roof panels have provided increased convenience and security over cars having convertible tops while also providing the open car advantages found in convertible tops, such panels are often inconvenient to place in position on the roof of the vehicle only a short period of time in order to protect the passenger compartment from the elements.

U.S. Pat. No. 4,475,764 to Hutchinson et al discloses an automobile cover for use with a car having a T-top configuration in which the cover is provided with suction cups whereby the cover may be attached to the car windows at the front, rear and sides of the cover. While such a cover provides an advantage over taking the panels out and attaching them for temporary protection of the interior of the automobile, it is necessary to align certain portions of this cover with the structure of the automobile during the attachment of the cover. Such an operation may prove difficult when one is simultaneously attempting to tension the straps 26 and 28 while maintaining proper alignment of the seals 24 and 30 in relation to the structure of the car. Further, the cover requires a plurality of attachment points with relation to the car, and the use of suction cups for attachment may result in detachment of the cover in severe weather conditions such as high winds and drastic changes of temperature.

Accordingly, what is needed is a car cover which is easily installed with a minimum of attention required for alignment between the cover and the roof structure of the car. In addition, a cover is needed which may be quickly and securely installed onto the roof portion of a car and which may be easily tensioned over the passenger compartment without disturbing the alignment of the cover.

SUMMARY OF THE INVENTION

The present invention provides a car cover for use with cars having a removable top and a hatchback rear window wherein the hatchback rear window is pivoted from a structural member immediately behind the removable top area.

The cover includes a flexible body portion having top and bottom surfaces, a front edge, a rear edge and opposing longitudinal edges connecting the front and rear edges. The intersection between the front edge and the longitudinal edges defines front corner portions which are preferably formed as shallow concave portions for extending around the junction between the upper corners of the windshield and the side window portions of the car. In addition, each front corner portion includes an elastically flexible cord which is formed as a loop for engaging the side mirrors of the car to hold the front portion of the cover in place.

Flap means in the form of a pair of flaps are attached to the bottom surface of the body portion of the cover at a location spaced forwardly from the rear edge of the body portion and extend rearwardly beyond the rear edge.

Thus, the flaps may be sandwiched between the hatchback of the car and the structural member supporting the hatchback to hold the rear portion of the cover in place and the elastic cords may be stretched around the side mirrors of the car to draw the cover tight and hold the front portion of the cover in place. In addition, when the cover is in place the rear edge of the cover will extend rearwardly beyond the forward edge of the hatchback to thereby direct water away from the area where the flaps engage the hatchback and the structural member supporting the hatchback.

DETAILED DESCRIPTION OF THE PREFERRED EMBODIMENT

Figure 1:
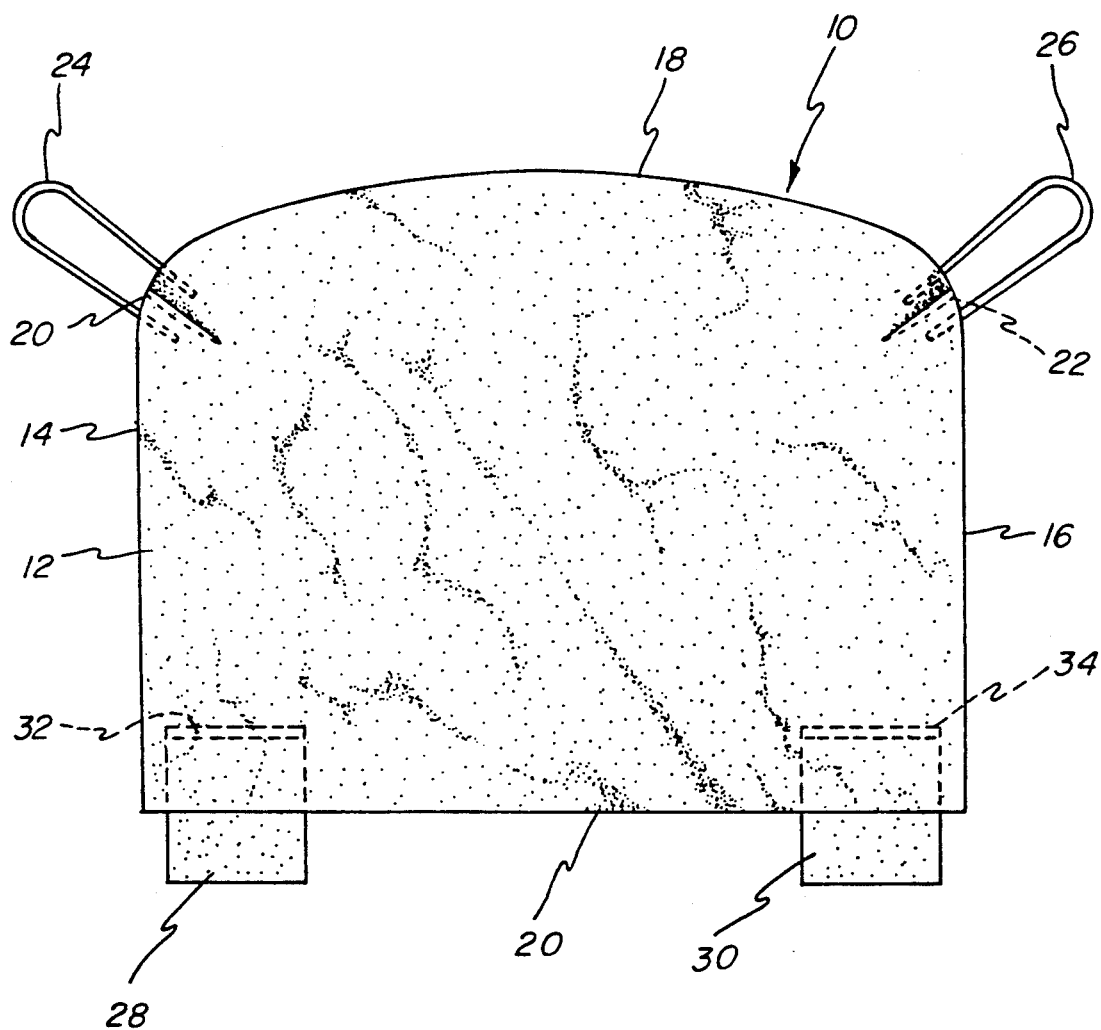
FIG. 1 is a plan view of the cover of the present invention.

Referring to FIG. 1, the car cover of the present invention is shown and designated generally as 10. The cover 10 includes a generally planar body portion 12 formed of a flexible material such as nylon, canvas, vinyl or other water repellant material.

The body portion 12 includes first and second longitudinal edges 14, 16, a generally arcuate front edge 18 and a substantially straight rear edge 20. The longitudinal edges 14 and 16 meet the front edge 18 at front corner portions 20, 22 and elastic cords 24, 26 are attached at each of the corner portions 20, 22. The opposite ends of the elastic cords 24, 26 may be sewn to the underside of the body portion 12 to form loops of the elastic cords 24, 26 to facilitate attachment of the cover 10 to the car, as will be described further below.

The cover 10 also includes a pair of flap portions 28, 30. The flap portions 28, 30 are of a generally quadrilateral shape and are preferably approximately square. The flap portions 28, 30 are each attached along a stitch area 32, 34 which are spaced forwardly of and oriented substantially parallel to the rear edge 20, and the flap portions 28, 30 extend rearwardly beyond the rear edge 20 of the body portion 12. In addition, the flap portions 28, 30 are located laterally inwardly toward the center of the body portion 12 and spaced from the longitudinal edges 14, 16. In the preferred embodiment, the lateral spacing of the flap portions 28, 30 from the longitudinal edges 14, 16 is approximately equal to 1½ inches.

Figure 2:
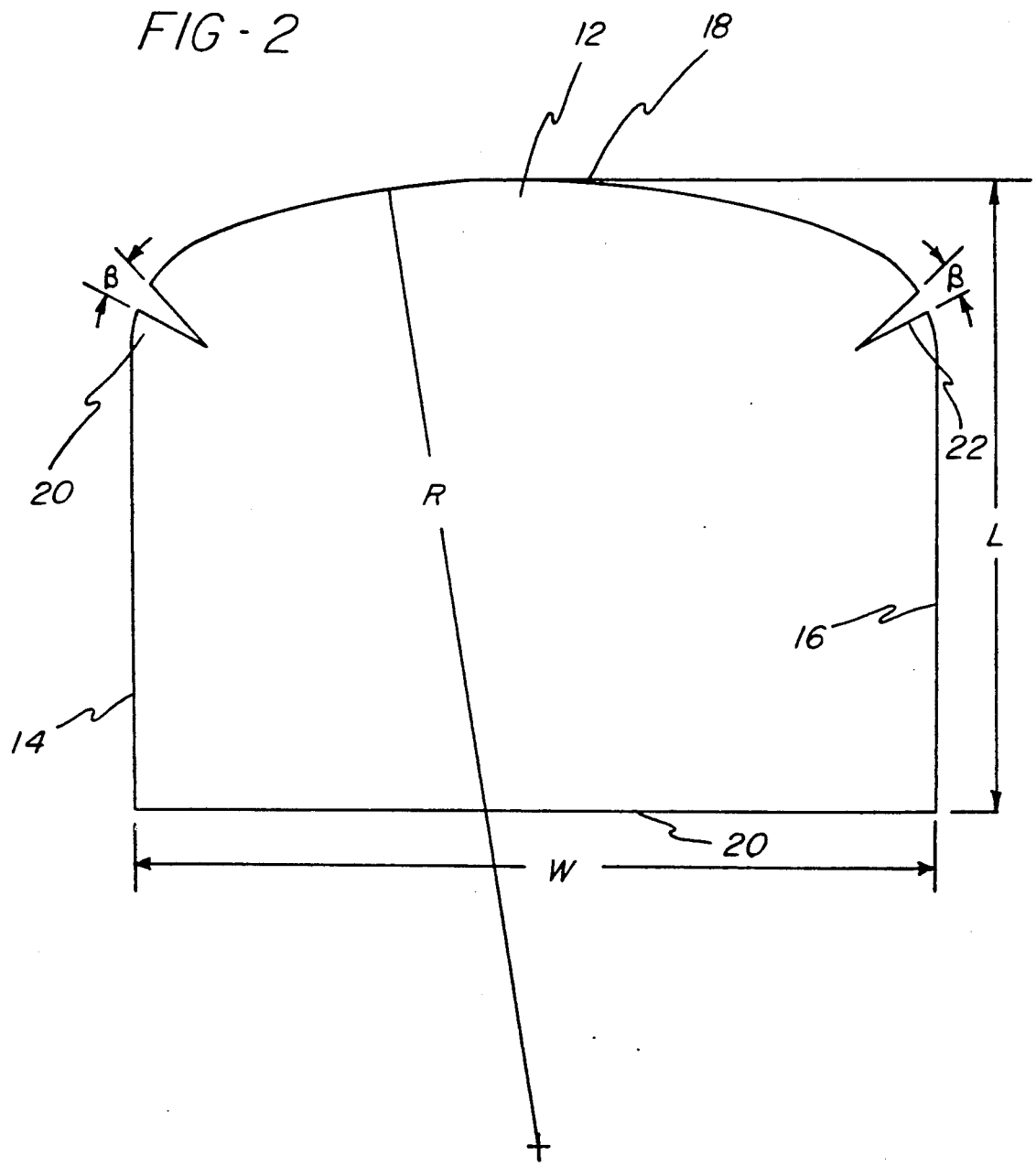
FIG. 2 is a plan view of the body portion of the cover prior to assembly of the cover.

Referring to FIG. 2, the body portion 12 is shown prior to attachment of the elastic cords 24, 26 and the flap portions 28, 30. The front corner portions 20, 22 are initially formed with a V-shaped cut-out wherein the cutout material forms a predetermined angle $\beta$. The opposing edges of the V-shaped cut-out are sewn together such that a shallow concave portion is formed at each of the front corners 20, 22. These concave portions are adapted to receive and substantially follow the contours of the junction formed between the upper corners of the windshield and the side windows of the car to thereby insure that the elements do not pass under the cover at the front corners to enter the passenger compartment of the car.

In the preferred embodiment, the length L of the body portion 12, as measured between the front and rear edges 18, 20, is substantially less than the width W, as measured in a direction perpendicular to the longitudinal edges 14, 16. As a specific example, the length may be formed with a dimension of 42 inches and the width with a dimension of 54 inches. Further, the V-shape cut-outs at the front corners 20, 22 may be formed with an angle of 15° and the front edge 18 may be formed with an arcuate curve having a radius R of approximately 64¼ inches. In this example of the embodiment, the flap portions 28, 30 may each be formed with a width of 8 inches and a length of 8 to 8½ inches and the forward edge of the flap portions 28, 30 may be spaced forwardly from the rear edge of the body portion 12 by a distance of approximately 5 inches. Further, the elastic cords may have a length of approximately 28 inches such that the length of each leg of the loops on the opposing corners 20, 22 is approximately equal to 1 ft. prior to being stretched for attachment to the side mirrors of the car.

Figure 3:
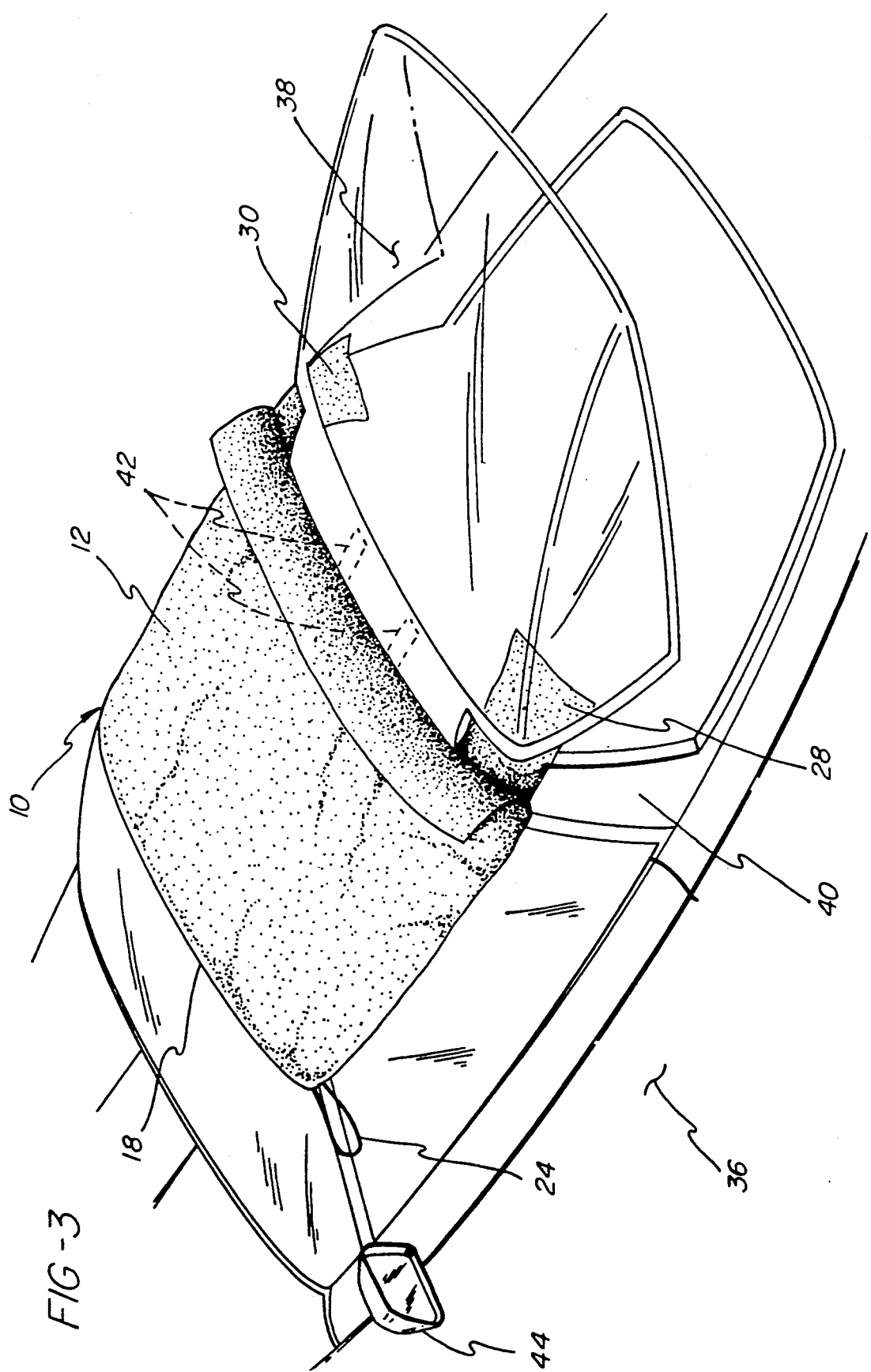
FIGS. 3 and 4 are perspective views of the cover being attached to a car.

Installation of the car cover 10 onto a car will now be described with reference to FIGS. 3 and 4. As may be seen, the body portion 12 of the car cover 10 is placed over the passenger compartment of a car 36. The car includes a hatchback rear window 38 which is pivoted to a structural support member 40 of the car 36 by means of a central pivot member 42.

Figure 4:
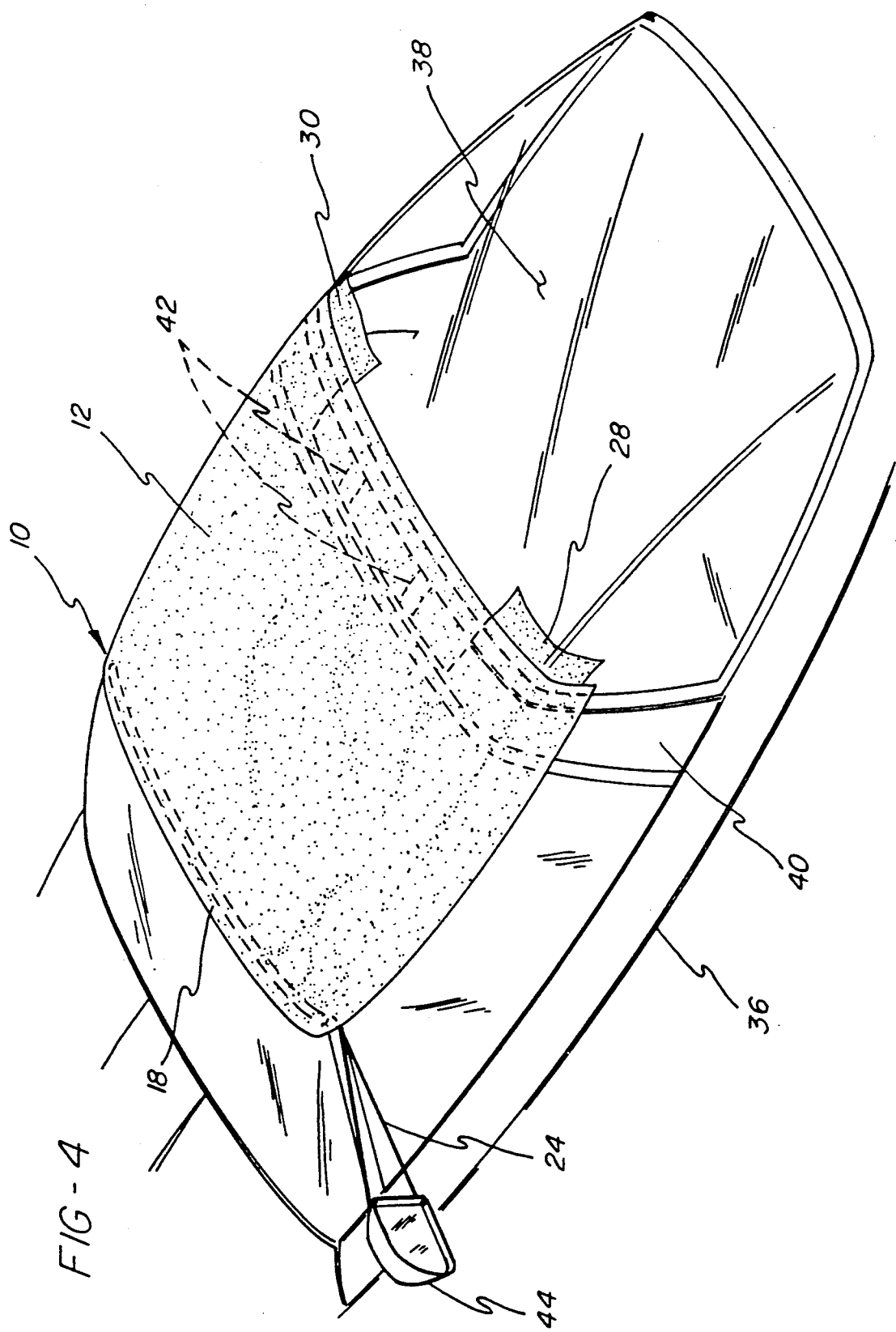

The flap portions 28, 30 are positioned to extend underneath the front edge of the rear window 38 such that upon closing the rear window hatch 38, the flap portions 28, 30 will be caught and sandwiched between the front edge of the rear window hatch 38 and the rear edge of the structural member 40 to thereby hold the rear portion of the cover 10 immovably in place on the car 36, as seen in FIG. 4. It should be noted that by providing the separate flap portions 28, 30, the rear corners of the cover 10 are effectively held in place to position the outer edges 14, 16 of the body portion 12 while also providing clearance for the centrally located pivot member 42.

Further, by locating the attachment areas 32, 34 for the flap portions 28, 30 forwardly of the rear edge 20 of the body portion and inwardly from the longitudinal edges 14, 16, the body portion 12 is allowed to overlap the seam or joint where the rear window 38 seals up against the support member 40, such that the body member 12 will overlie any openings or spaces created in the weatherstripping between the window 38 and member 40 to prevent water from seeping in at these locations. Thus, in the embodiment described above, more than half the length of the flaps 28, 30 will extend from the stitch area 32, 34 to the rear edge 20 and the rear portion of the cover 10 may extend over the rear hatch 38 by as much as 5 inches.

Figure 5:
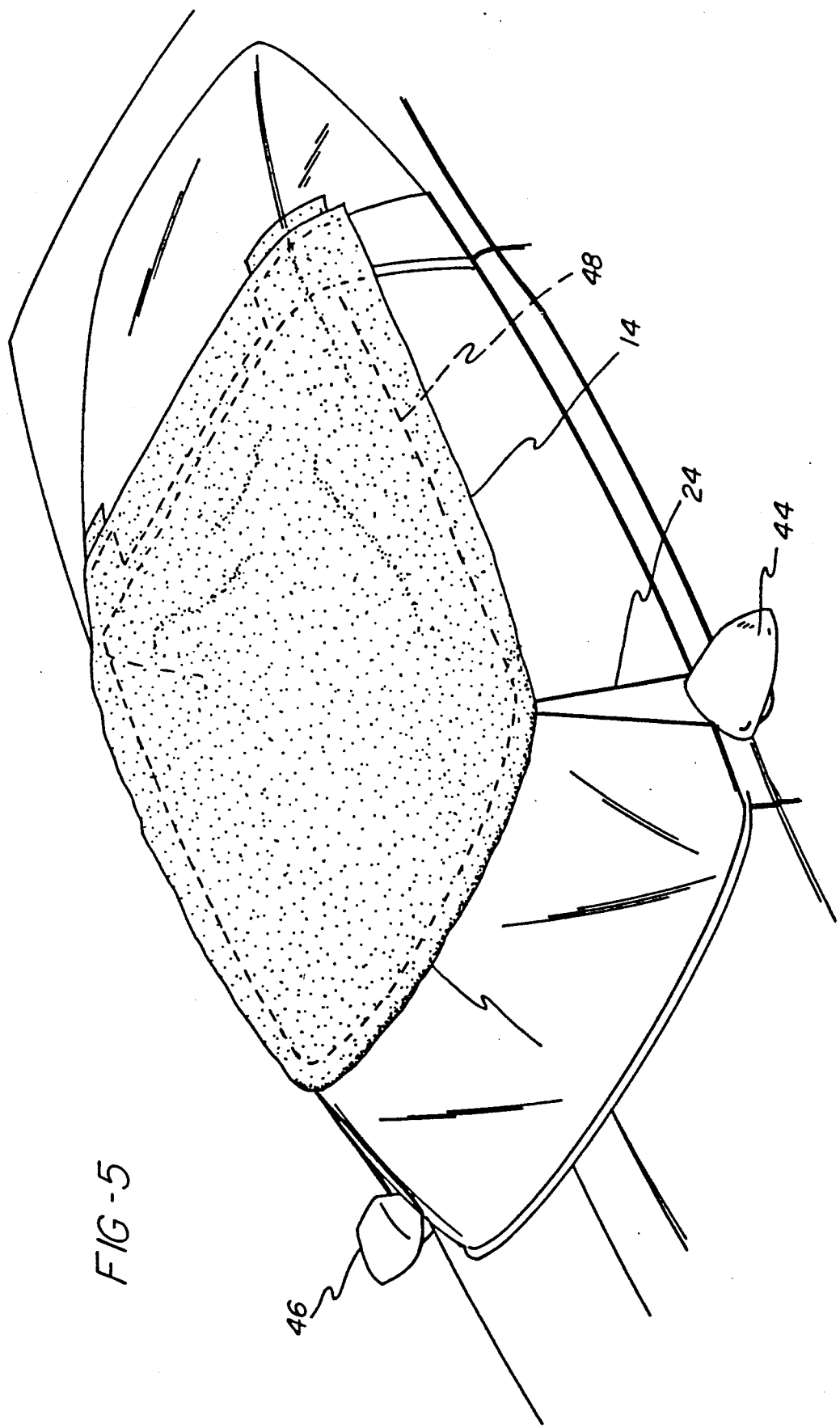
FIG. 5 is a perspective view of the cover in place on a car.

With the rear window hatch 38 closed on the flap portions 28, 30, the elastic cords 24, 26 may be then stretched to extend around the side mirrors 44, 46 of the car 36 to draw the body portion taut over the passenger compartment and hold the front edge 18 in place around the upper edge of the windshield, as seen in FIG. 5. It should also be noted that the width W of the body portion 12 is of sufficient extent to permit the longitudinal edges 14, 16 to extend beyond the upper edge 48 of the side windows and thereby prevent the elements from passing into the passenger compartment at the sides of the car 36.

The present invention also may be used to facilitate protection of the interior of the car when the removable panel or panels are still in place. Since the removable panels are often formed of a transparent material to permit sunlight to pass through, the cover may be placed over the panels to protect both the panels and the car interior from the detrimental effects of sunlight, as well as to keep the interior of the car from becoming excessively hot.

While the form of apparatus herein described constitutes a preferred embodiment of the invention, it is to be understood that the invention is not limited to this precise form of apparatus and that changes may be made herein without departing from the scope of the invention which is defined in the appended claims.

What is claimed is:

1. A car cover for use with cars having a removable top and a hatchback rear window, said cover comprising:
   a flexible body portion having top and bottom surfaces, a front edge, a rear edge and opposing longitudinal edges connecting said front and rear edges,
   front corner portions defined at the intersection of said longitudinal edges with said front edge,
   an elastic cord extending from each of said front corner portions for attachment adjacent to the windshield of the car,
   flap means attached to said bottom surface at a location spaced from said rear edge, said flap means extending rearwardly beyond said rear edge, and
   wherein said cords are attachable to the car and said flap means are positionable between the hatchback and a structural member of the car supporting the hatchback with the hatchback closed to hold said body portion taut over the passenger compartment of the car with said rear edge of said body portion extending rearwardly past a forward edge of the hatchback.

2. The car cover of claim 1, wherein the length of said body portion, measured between said front and rear edges along a line parallel to said longitudinal edges, is substantially less than the width of said body portion, measured in a direction perpendicular to said longitudinal edges.

3. The car cover of claim 1, wherein said rear edge is substantially straight and said front edge defines an arcuate line between said front corner portions.

4. The car cover of claim 1, wherein each of said elastic cords defines a loop of material for extension around side mounted mirrors on the car to hold said front corner portions in position adjacent to the windshield of the car.

5. The car cover of claim 1, wherein said front corner portions are formed as shallow concave portions for extending around the junction between the car roof, the windshield and a side window portion of the car.

6. The car cover of claim 5, wherein said front edge defines an arcuate line between said front corner portions.

7. The car cover of claim 6, wherein said front edge has a radius of curvature of approximately sixty-four and a half inches.

8. The car cover of claim 1, wherein said rear edge defines a straight line extending from one longitudinal edge to the other.

9. The car cover of claim 1, wherein said flap means comprises a pair of spaced flap portions positioned adjacent to opposing longitudinal edges of said body portion.

10. The car cover of claim 9, wherein said flap portions are each spaced inwardly from said longitudinal edges and toward the center of said body portion such that a strip of each of said longitudinal edges is located laterally outwardly from the location where said flaps are attached to said body portion.

11. The car cover of claim 9, wherein said flap portions are each attached to said body portion along a line substantially parallel to said rear edge.

12. The car cover of claim 1, wherein said flap means includes at least one flap portion having a quadrilateral shape and a portion of said flap portion extending from an attachment point of said flap portion with said body portion to the rear edge defines a greater length than the remaining portion of said flap portion extending rearwardly from said rear edge.

* * * * *